June 11, 1968  R. A. BLATZ  3,387,307
PLASTIC GLOVE
Original Filed May 12, 1964  2 Sheets-Sheet 1
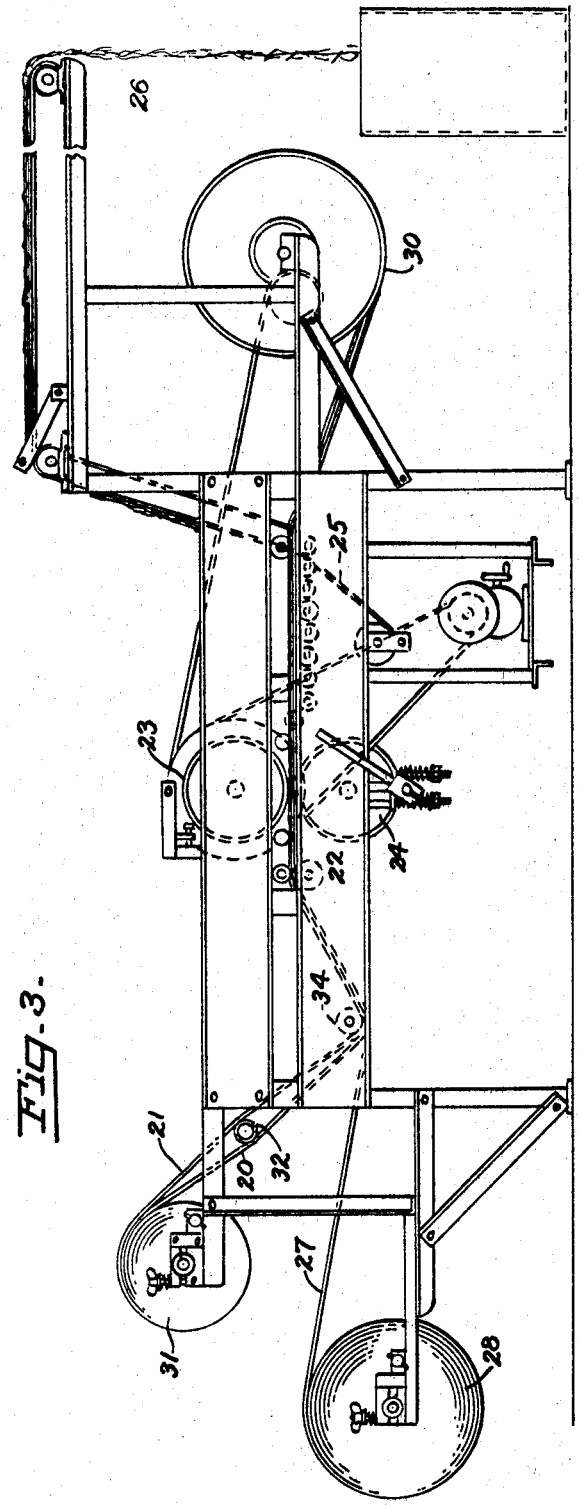
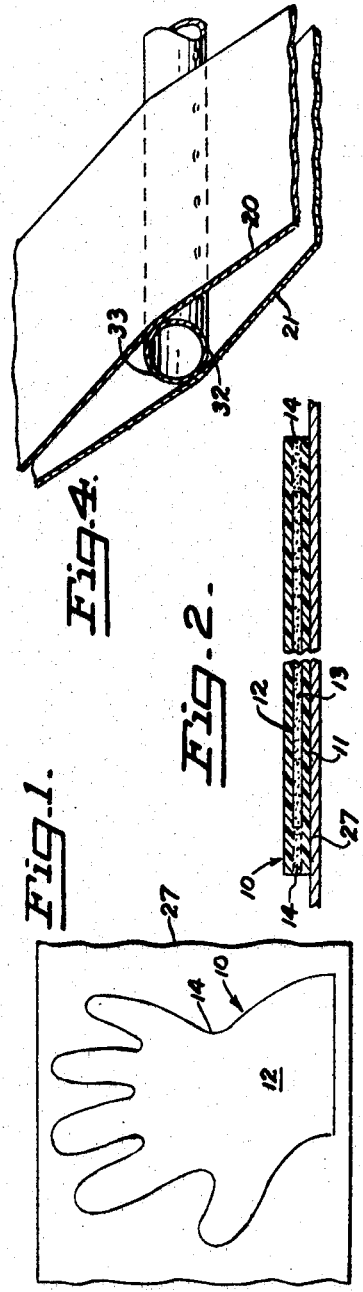
INVENTOR
ROBERT A. BLATZ
BY 
ATTORNEYS

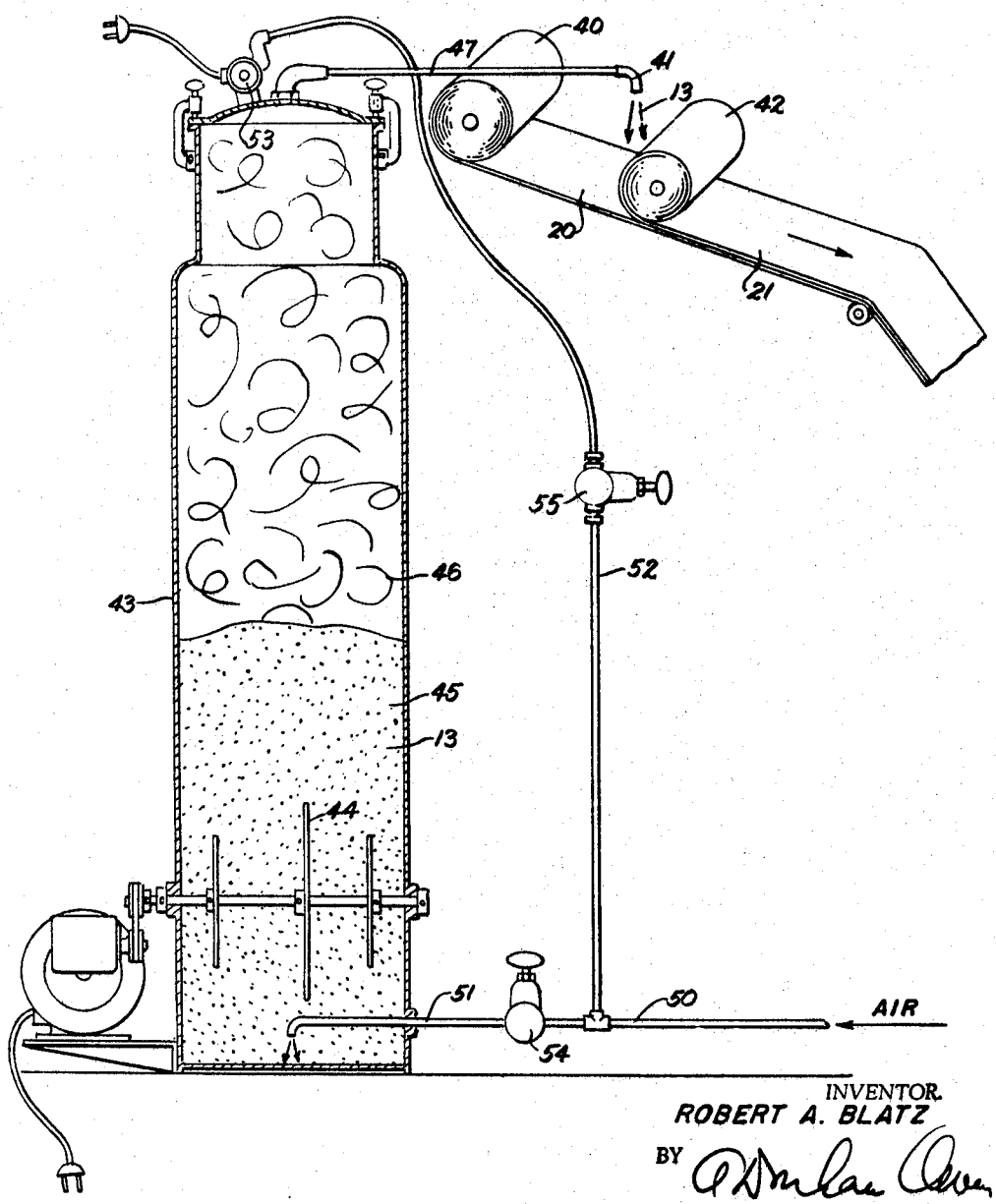

United States Patent Office 3,387,307
Patented June 11, 1968

---

3,387,307
PLASTIC GLOVE
Robert A. Blatz, Clayton, Calif., assignor, by mesne assignments, to Handgards, Inc., Pittsburgh, Pa., a corporation of Nebraska
Original application May 12, 1964, Ser. No. 366,696, now Patent No. 3,329,548. Divided and this application Jan. 12, 1967, Ser. No. 630,155
3 Claims. (Cl. 2—167)

ABSTRACT OF THE DISCLOSURE

In a glove or boot of the type comprising two sheets of thin thermoplastic material fused together along a foot outline or a hand outline with or without finger openings, to provide an enclosure for a hand or foot, at least one of the sheets has on its inside surface an even coating of separating material compatible with the plastic and fusable into the seam, the coating is finely powdered and distributed evenly over the surface thereof to keep the two sheets from tending to stick together except where they are fused together at the seam. The thin thermoplastic material may be polyethylene or copolymers of polyethylene and ethylacrylate, and the coating may be finely powdered polyethylene.

---

This application is a division of application Ser. No. 366,696, filed May 12, 1964, now U.S. Patent 3,329,548.

This invention relates to an improved plastic glove or boot of the sheet type.

Plastic sheet gloves are made by welding together configurated forms from two sheets of plastic. These gloves are usually sold in individual pairs in sheet form or in sheet rolls like rolls of waxed paper. They are gently adhered to a paper backing or other carrier, from which they are readily separated for use. While they do not give a tailored fit, they do give sufficient conformation to the hand for many applications where disposable hand covers are desirable.

It is difficult to insert one's hands into sheet gloves during warm weather or at any time when the hands are moist or are perspiring slightly. Previously, this problem has been attacked by blowing open each glove right after the seaming operation, by a blast of air, and blowing into it some talc, cornstarch, or other material conventionally used to enable the gloves to slip over the hands more easily. This blowing-in operation has added to the expense of manufacturing the glove in several ways. It has required an extra step at the end, that of opening the glove and blowing the separating material in; since even distribution of the talc is difficult to get by blowing it in, an excess of it has been used; less obviously, the method of application leads to other severe disadvantages.

Another way of applying powder between the glove surfaces has been to apply powder to one of the plastic sheets before the seaming operation. Since the aforementioned powders tend to prevent welding or fusing together of the plastic sheets, the powder had then to be kept away from the seam. Consequently, this method required the use of a reciprocating device shaped like the glove, but slightly smaller, so as to prevent any powder from being deposited on any part of the sheet which would later become the glove seam. This device dipped into a powder reservoir and then stamped the powder, by reciprocating action, on the lower plastic sheet, thereby depositing a thin layer of powder on what would later be one of the inside surfaces of the glove. This method had serious drawbacks, for it materially reduced the speed of production; since the continuous webs of material had to be stopped while the reciprocating powdering device was powdering the lower web for a given glove; then the web moved on, only to stop once again for powdering of the next glove.

Plastic gloves can be made in a continuous process with movement at a continuous rate except for this step of applying talc to provide later ease of entry for the hands. For that step and that step alone, the reciprocating action was necessary in order to insert the nozzle into the glove or in order to use the reciprocating powdering die. Since the reciprocation is possible only when the plastic sheets are stationary, production output has been reduced, for to stop their otherwise continuous movement slowed down the process and added further to the expense of manufacture by considerably cutting down the productivity.

The talc, starch, or other separating material cannot be applied by fully covering either of the polyethylene sheets before the fusing or welding seaming operation, because the talc is so effective in preventing adhesion that the intended welding along the seams simply does not take place or takes place unevenly, creating pin holes, and the resulting gloves are, at best, hampered by very weak seams, if, indeed, they have any seams at all.

Thus, what might seem at first glance to be a simple operation of introducing a powder into the gloves becomes a major factor in the cost of their manufacture and in the quantity that can be produced daily.

The present invention provides a new type of powder between the sides of the glove which makes it possible to improve the method of manufacture of the glove in a way that greatly increases productivity. Unidirectional and continuous movement is obtained, without any reciprocation or stopping. Hence, production costs are reduced.

These and other objects and advantages of the invention will be better understood from the following description of a preferred form of the invention.

In the drawings:

FIG. 1 is a top plan view of a plastic sheet glove embodying the principles of the invention.

FIG. 2 is an enlarged fragmentary view in section taken along the line 2—2 in FIG. 1, with greatly enlarged and out-of-scale thicknesses being shown.

FIG. 3 is a view in side elevation of apparatus used to manufacture the glove of this invention according to the method of this invention.

FIG. 4 is a fragmentary enlarged view in perspective and partly in section of the powder introduction tube used in the apparatus of FIG. 3.

FIG. 5 is a view mainly in elevation and in section of a powder storage tank and takeoff means with a portion in perspective of a part of a modified form of glove making apparatus.

In this invention the two plastic sheets comprising the glove are separated from each other except at the seam by a uniform coating deposited on at least one of the two sheets, the coating being made of material which is compatible with and weldable to the sheets. For example, in the glove 10 shown in FIGS. 1 and 2, the plastic sheets 11 and 12 may be polyethylene or may be a copolymer of polyethylene and ethylacrylate or they may be of other suitable plastic sheeting material. The separating coating 13, which is shown in FIGS. 2 and 5 as applied to one only of the sheets 11 and 12 and is shown in FIGS. 3 and 4 as applied to both sheets 11 and 12, is a finely powdered form of compatible plastic. For example, the coating 13 may be polyethylene or the copolymer of polyethylene and ethylacrylate. Since polyethylene powder is compatible and weldable with polyethylene sheeting and also with sheeting of copolymers thereof, the material 13 enables use of a novel method of manufacture. Being finely powdered, this material has the property of enabling insertion of the hands into the glove between the two sheets 11 and 12 quite as effectively as talc, starch and other agents normally used; yet it may be placed on one or both of the sheets 11, 12 beforehand without decreasing the effectiveness of the welding operation that makes the seams 14.

Thus, the glove 10 of this invention has a uniform coating 13 of the separating material on it, and the separating material 13 itself forms part of the weld or seam 14. This is a novel article that gives very effective results.

The method improvements enabled by this invention are quite important. In the current process, the glove 10 is made from two sheets 20 and 21 of sheet plastic, which are bought in rolls, unrolled therefrom, seamed together in glove outline and the gloves severed from the sheets 20 and 21 at a welding and severing station 22 where electric heat from a suitably shaped heating element on a roller 23 both makes the seam while holding the sheets 20 and 21 against a die roller 24 and simultaneously severs the glove from the sheets, leaving scrap sheets 25 and 26. Simultaneously, the glove 10 is adhered removably to a supporting paper sheet 27 from a roll 28. The paper sheet 27 with the gloves 10 on it is then wound onto a roll 30.

The novel feature in the present invention is that the powder 13 is distributed evenly over the plastic sheets 11 and 12, or at least over one of the two sheets 20 and 21, on the side which will face the other sheet, *before* the welding and severing operation at the zone 22.

In one embodiment, shown in FIGS. 3 and 4, the polyethylene plastic may be supplied in a two-sheet roll 31 (two sheets wound together on the one roll), though it could also be supplied in two single-wound rolls, and the sheets 20 and 21 are separated from each other by being led on opposite sides of a perforate tube 32. The polyethylene powder 13 is dispensed by air pressure through the openings 33 in the tube 32 and covers both sheets 20 and 21 lightly and evenly. The two sheets 20 and 21 are then brought against the paper backing 27 at roller 34, for the seaming and severing can be done even with the paper present, as has been known before. In this instance, the seaming fuses in such powder 13 as is present at the seam line 14. The process is completely continuous and at a uniform speed.

The powder 13 may, as shown in FIG. 5, be applied to only one sheet 20 from a roll 40, by a spray nozzle 41, the other sheet 21 coming from a second roll 42. In either method, the powder 13 may be dispensed from a tank 43 which may be cylindrical. The tank 43 may have a paddle type agitation 44 in its lower portion which rapidly whips around in the lower half 45 where the powder 13 of the compatible plastic is deposited. The upper half 46 of the tank is not filled with powder. The whipping-around operation of the agitator 44 not only results in agitation but also in sending powder 13 up into the upper part 46 of the tank 43, where it is suspended in air and is drawn out in an airstream through a pipe 47.

Air is introduced to the bottom of the tank 43 from pipes 50 and 51 through a downwardly directed nozzle 52 that helps to agitate the powder 13 and carry it up into the portion 46. Air is also introduced to the upper portion 46 by pipes 50 and 51 and nozzle 52. Regulators 54 and 55 enable careful regulation of air flow. The suspension of the powder 13 in the air in the space 46 is important in obtaining even and regulated distribution through the nozzle 41 for a substantially uniform deposit on the sheet 20.

During the welding operation at the zone 22, the portion of the plastic powder 13 at the seam 14 is melted at the same time that the plastic sheets are fused. For example, if polyethylene powder 13 is used and if the sheets 20 and 21 are polyethylene, they all fuse together into an identical composition. However, the remainder of the powder 13 still retains its anti-sticking property and acts to keep the two glove sheets 11 and 12 apart. It does not fuse and does not get sticky. In the glove 10 the material 13 is uniformly distributed instead of being unevenly distributed because of having to be blown into a formed glove. The glove 10 does not have to be opened at all during the manufacturing process, it is simply rolled up on the paper backing 27 and packaged.

The fact that the separating powder 13 is added before the welding or actual glove-seaming operation enables the apparatus to be run at a consistent speed in one direction. This in itself results in a great saving of time and a great increase in productivity.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A glove comprising two sheets of thin thermoplastic material chosen from the group consisting of polyethylene and copolymers of polyethylene and ethylacrylate fused together along a hand outline to define finger openings and provide an enclosure for a hand, at least one of said sheets having on its inside surface an even coating of finely powdered polyethylene, said coating being distributed evenly over the surface thereof to enable easy opening of the glove while being fused together with said sheets at the seam.

2. A glove comprising two sheets of thin thermoplastic material fused together to form a seam along a hand outline to define finger openings and provide an enclosure for a hand, at least one of said sheets having on its entire inside surface an even coating of finely powdered separating material compatible with the thermoplastic and fused into said seam to keep the two sheets from tending to stick together execept where they are fused together at the seam.

3. A glove as defined in claim 2 wherein the thermoplastic and separating powder are the same material.

References Cited
UNITED STATES PATENTS

| | | | |
|---|---|---|---|
| 3,028,576 | 4/1962 | Gerard | 2—167 X |
| 3,050,738 | 8/1962 | Rytina | 2—167 |
| 3,072,914 | 1/1963 | Velonis et al. | 2—167 |
| 3,151,333 | 10/1964 | Scholz | 2—167 X |
| 3,235,881 | 2/1966 | Chisholm | 2—167 |

JORDAN FRANKLIN, *Primary Examiner.*

G. V. LARKIN, *Assistant Examiner.*